United States Patent
Dover

(10) Patent No.: US 11,294,582 B2
(45) Date of Patent: Apr. 5, 2022

(54) CUSTOMER-SPECIFIC ACTIVATION OF FUNCTIONALITY IN A SEMICONDUCTOR DEVICE

(71) Applicant: Micron Technology, Inc., Boise, ID (US)

(72) Inventor: Lance W. Dover, Fair Oaks, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 17/014,203

(22) Filed: Sep. 8, 2020

(65) Prior Publication Data

US 2022/0075537 A1 Mar. 10, 2022

(51) Int. Cl.
*G06F 3/06* (2006.01)

(52) U.S. Cl.
CPC ............ *G06F 3/0629* (2013.01); *G06F 3/062* (2013.01); *G06F 3/0679* (2013.01)

(58) Field of Classification Search
CPC ....... G06F 3/0629; G06F 3/062; G06F 3/0679
See application file for complete search history.

(56) References Cited

U.S. PATENT DOCUMENTS

| | | |
|---|---|---|
| 8,081,754 B2 | 12/2011 | Huh et al. |
| 2009/0089582 A1 | 4/2009 | Brutch et al. |
| 2011/0164749 A1* | 7/2011 | Natarajan ............. H04L 9/3228 380/270 |
| 2013/0219191 A1 | 8/2013 | Wishman et al. |
| 2014/0105400 A1 | 4/2014 | Lietzke et al. |
| 2015/0334114 A1* | 11/2015 | Scarlata .................. G06F 21/81 713/170 |
| 2016/0212617 A1* | 7/2016 | Koshimizu ........... H04W 12/06 |
| 2018/0026800 A1* | 1/2018 | Munoz ................ G06F 9/30036 713/156 |
| 2020/0183677 A1 | 6/2020 | Hong et al. |
| 2021/0028942 A1* | 1/2021 | Dover ................... H04L 9/3247 |
| 2021/0141780 A1* | 5/2021 | Ahmed-Rengers ......................... G06F 16/2272 |
| 2021/0223968 A1* | 7/2021 | Umesawa ............. G06F 3/0679 |
| 2021/0334017 A1* | 10/2021 | Troia ..................... G06F 21/72 |

OTHER PUBLICATIONS

International Search Report and Written Opinion, PCT/US2021/049317, dated Dec. 21, 2021.

* cited by examiner

*Primary Examiner* — Sean D Rossiter
(74) *Attorney, Agent, or Firm* — Greenberg Traurig

(57) ABSTRACT

The disclosed embodiments are related to securely updating a semiconductor device. In one embodiment, a method comprises receiving a command; generating, by the semiconductor device, a response code in response to the command; returning the response code to a processing device; receiving a command to replace a storage root key of the device; generating a replacement key based on the response code; and replacing an existing key with the replacement key.

20 Claims, 6 Drawing Sheets

CUSTOMER-SPECIFIC ACTIVATION OF FUNCTIONALITY IN A SEMICONDUCTOR DEVICE

RELATED APPLICATIONS

The present application relates to commonly-owned applications bearing Ser. Nos. 17/014,206 and 17/014,215, filed simultaneously with the instant application, the disclosures of which are incorporated by reference in their entirety.

FIELD OF THE TECHNOLOGY

At least some embodiments disclosed herein relate generally to semiconductor devices and, in particular, to providing secure field upgrades to semiconductor devices.

BACKGROUND

Currently, many semiconductor devices (e.g., semiconductor memory devices) provide field-upgradable functionality that allows for post-fabrication updates to the devices. For example, a memory device may provide the ability to update the firmware of the memory device after the memory device is fabricated and installed. Securing these field upgrades is paramount to the reliable and trusted operation of such devices. Some devices utilize symmetric encryption to secure field upgrades. In these devices, a manufacturer and semiconductor device share a secret key and rely on these keys to encrypt and decrypt field upgrades. In a symmetric key system, the keys are unique between two parties (e.g., manufacturer and end-user). However, key distribution in such systems suffers from numerous deficiencies remedied by the disclosed embodiments.

First, many systems rely exclusively on cloud-based key distribution techniques. These techniques require an end-user (e.g., device owner) to be connected to a public network to download keys. However, the requirement of a public network connection introduces potential security risks. Second, most cloud-based systems rely on unique identifier (UID) values to enable an end-user to request a symmetric key from a cloud-based platform. Generally, these UID values must read from the semiconductor device individually and uploaded individually. Thus, bulk access to symmetric keys is not feasible since the electrical identification of UID values is generally only available during manufacturing when access to a public network is not possible. Moreover, retrieving symmetric keys in a high-value manufacturing (HVM) environment is often not feasible given the temporal latency involved in the operation and the costs introduced by that latency.

DETAILED DESCRIPTION

The disclosed embodiments solve the aforementioned problems and other problems in the art. The disclosed embodiments allow end-users to activate capabilities in semiconductor devices using symmetric key cryptography in a manufacturing environment without requiring a connection to a public network and, ultimately, a cloud-based key management system (KMS). Further, the disclosed embodiments support requests for multiple symmetric keys at once. Further, the disclosed embodiments preserve the ability to prevent symmetric exposure end-to-end, but do so for multiple devices at once when connecting to a KMS. These and other features are described in more detail with reference to the disclosed embodiments.

Figure 1:
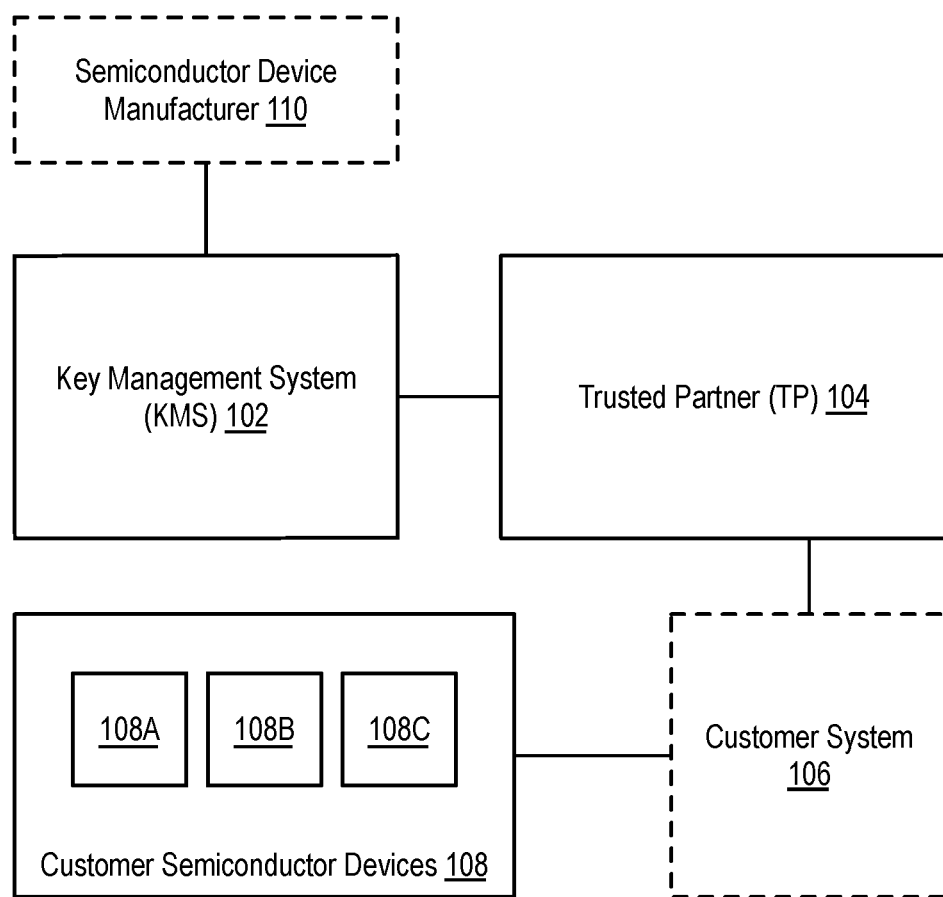
FIG. 1 is a block diagram illustrating an authentication system according to some embodiments of the disclosure.

FIG. 1 is a block diagram illustrating an authentication system according to some embodiments of the disclosure.

The illustrated system includes a semiconductor device manufacturer (110), KMS (102), trusted partner (TP) (104), customer system (106), and a plurality of semiconductor devices (108). In the illustrated embodiment, the manufacturer (110) is the manufacturer of devices (108). In the illustrated embodiment, the manufacturer (110) can communicate with the KMS (102) via a secure channel. In some embodiments, the manufacturer (110) uploads, for each device (108), a corresponding unique identifier (UID) and a device secret key, also referred to as a manufacturer's storage root key (MFGSRK) to the KMS (102). In the illustrated embodiment, the MFGSRK is generated in a secure manufacturing environment of the manufacturer (110). In some embodiments, the manufacturer (110) also uploads a customer identifier (CID) for each customer that purchases or otherwise is associated with a device (108). In some embodiments, the manufacturer also uploads a customer authentication key (CAK) associated with a CID. In one embodiment, the CAK is limited to a specified date range, thus becoming invalid after the last day of the range passes. The UID, MFGSRK, CID, and CAK values are collectively referred to as "manufacturing data."

In the illustrated embodiment, the KMS (102) stores the aforementioned data received from the manufacturer (110). In one embodiment, the KMS (102) comprises a server, or multiple servers, for storing the manufacturing data. In some embodiments, the KMS (102) utilizes a hardware security module (HSM) to secure the manufacturing data. In the illustrated embodiment, the KMS (102) is capable of generating activation codes for each of the received UIDs. In some embodiments, an activation code comprises an integer or similar processible value. In some embodiments, the KMS (102) generates an activation code in response to a request from TP (104).

In the illustrated embodiment, the TP (104) comprises a computing system that is securely and communicatively coupled to KMS (102). In the illustrated embodiment, the TP (104) issues network requests to the KMS (102) for batches of activation codes (also referred to as an activation database). In one embodiment, the request for an activation database includes the CID, a date range, a device type, and a nonce unique to a customer and known by the KMS (102) (referred to as "KMS nonce"). In some embodiments, a customer negotiates the KMS nonce with the KMS (102) via a network communication session, thus establishing a commonly known value for the KMS nonce. In the illustrated embodiment, the TP (104) receives and stores the contents of the activation database. In some embodiments, the TP (104) also includes an HSM for securing the activation database. In the illustrated embodiment, the TP (104) also includes processing capabilities for generating a message authentication code (MAC) for a given customer. Further, in the illustrated embodiment, the TP (104) includes processing capabilities for generating a secure database of shared device secrets based on the activation codes in the activation database and response codes received from semiconductor devices (108).

In the illustrated embodiment, the customer system (106) communicates with the TP (104). The customer system (106) may comprise a customer's manufacturing line or other systems for handling semiconductor devices (108). The specific arrangement of computing devices of the customer system (106) is not limited herein. In some embodiments, TP (104) comprises one or more secure computing devices installed within a customer system (106). In other embodiments, the TP (104) is a separate computing system from the customer system (106).

In the illustrated embodiment, the customer system (106) interacts with a plurality of semiconductor devices (108a), (108b), (108c) (collectively, 108). The devices (108) comprise semiconductor devices such as, but not limited to, memory devices. For example, devices may comprise NOR or NAND Flash memory chips, system-on-a-chip (SoC) devices, or other types of discrete semiconductor packages.

The devices (108) include a plurality of non-volatile storage locations for storing various fields and parameters such as a CID and CAK. The devices (108) additionally include hardware or firmware capable of performing cryptographic operations such as operations supporting a MAC. Examples of such operations include HMAC-SHA256, AES, and CMAC operations. The details of devices (108) are described more fully in the following FIG. 2 and are not repeated herein.

Figure 2:
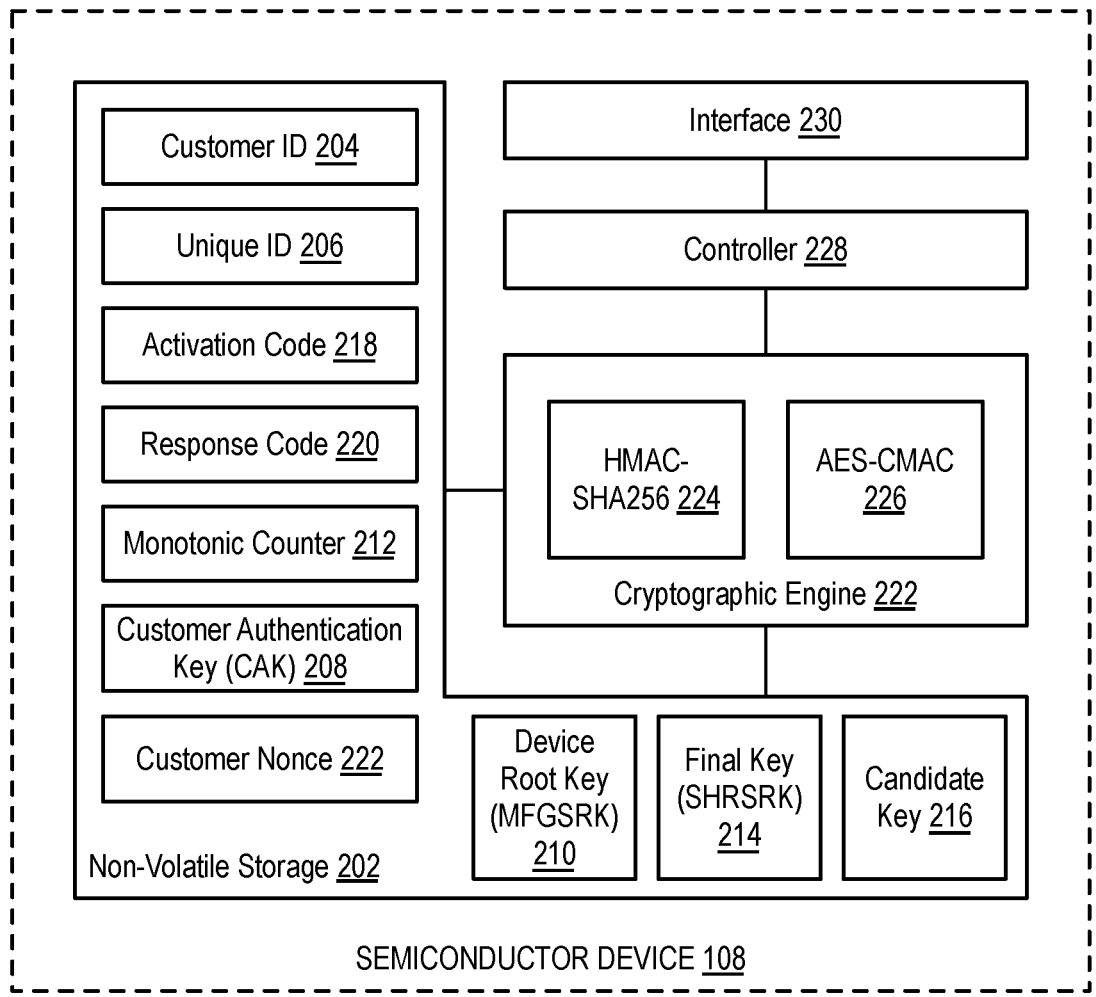
FIG. 2 is a block diagram illustrating a semiconductor device according to some embodiments of the disclosure.

FIG. 2 is a block diagram illustrating a semiconductor device according to some embodiments of the disclosure.

As illustrated, the semiconductor device (108) includes an interface (230), controller (228), cryptographic engine (232), and non-volatile store (202). Details of these components are described herein. The device (108) may include more or fewer components than illustrated in FIG. 2, and no limitation is placed on additional components included within the device (108). For example, the device (108) may comprise a memory device such as a NAND Flash device. In this example, the device (108) may further include an array of NAND Flash chips and a controller for accessing such chips.

In the illustrated embodiment, the device (108) communicates with external devices via an interface (230). In one embodiment, the interface (230) may comprise any interface for communicating electronic signals. In one embodiment, the interface (230) may comprise a serial peripheral interface (SPI) or universal asynchronous receiver-transmitter (UART) interface. In alternative embodiments, the interface (230) may comprise a Peripheral Component Interconnect Express (PCIe) or a Non-Volatile Memory Express (NVMe) interface. In general, any suitable bus useable to transmit and receive data may be used.

The interface (230) transmits commands and data to the controller (228). In some embodiments, the controller (228) may perform various commands to operate the device (108). The illustrated embodiment places no limit on the types of commands that may be processed by the controller (228).

In the illustrated embodiment, the controller (228) is communicatively coupled to a cryptographic engine (232). In some embodiments, the cryptographic engine (232) is integrated as part of the controller (228). In other embodiments, the cryptographic engine (232) may comprise a separate processing element. In some embodiments, the cryptographic engine (232) may comprise a cryptographic co-processor. In general, the cryptographic engine (232) performs various cryptographic operations on data stored in non-volatile storage (202) or received via controller (228). As illustrated, in some embodiments, the cryptographic engine (232) performs HMAC-SHA256 (224) and AES-CMAC (226) operations, although other algorithms may be utilized. In some embodiments, the operations (224, 226) may be implemented as firmware and executed by the cryptographic engine (232). In other embodiments, the operations (224, 226) may be implemented in hardware (i.e., dedicated circuitry).

In the illustrated embodiment, the cryptographic engine (232) reads and writes to various fields (204-220) stored in non-volatile storage (202). The illustrated fields (204-220) are briefly described herein, and reference is made to the descriptions of FIGS. 3 and 4, which provide further detail therein.

The non-volatile storage (202) includes a customer identifier (CID) field (204). In the illustrated embodiment, a CID comprises a unique identifier that uniquely identifies a customer. As used herein, a customer refers to any entity that utilizes semiconductor devices. For example, a customer may comprise a manufacturer of electronic devices that include semiconductor devices. In the illustrated embodiment, the CID is known by the customer as well as all entities depicted in FIG. 1. In some embodiments, the contents of the CID field (204) may read by the cryptographic engine (232) or controller (228). In some embodiments, the CID may be written by the manufacturer (110).

The non-volatile storage (202) includes a unique ID (UID) field (206). In the illustrated embodiment, a UID refers to a unique identifier that uniquely identifies the semiconductor device (108). In some embodiments, the UID may comprise a serial, barcode, or other electrically readable identifiers. During manufacturing, a manufacturer (110) may generate the UID and write the UID to the field (206). The UID may not be known until digitally read by the customer (e.g., during the manufacturing of a larger device). In some embodiments, the UID is read during manufacturing and thus is performed "offline" (i.e., not connected to a network device). In some embodiments, the UID includes a date field describing the manufacturing date of the semiconductor device (108). If a date field is included, the UID may include additional fields as well. In some embodiments, the contents of the UID field (206) may read by the cryptographic engine (232) or controller (228).

The non-volatile storage (202) includes an activation code field (218). In the illustrated embodiment, the activation code comprises a data field used to activate a new storage root key, such as SHRSRK (214). In one embodiment, the data in the activation code field (218) is generated by the cryptographic engine (232) and written to the activation code field (218). In one embodiment, the cryptographic engine (232) generates the activation by performing an HMAC operation (224) using a nonce value (222) as a message and a manufacturing stored root key (210) as the key, as described in more detail herein. In other embodiments, the manufacturing stored root key (210) is used as the key and the nonce value (222) is used as the message. The various embodiments described herein that utilize a nonce value (222) as a key and root key (210) as a message may be swapped and the similar descriptions of such operations are not repeated herein. In one embodiment, the activation code is not exposed outside of the device (108) and thus, in some embodiments, is not readable by the controller (228).

The non-volatile storage (202) includes a response code field (220). In one embodiment, the response code field (220) is generated by the cryptographic engine (232). In one embodiment, the response code is generated after the activation code field (218) is populated, as will be discussed. In one embodiment, the cryptographic engine (232) generates response codes by performing an HMAC operation (224) using the value of the monotonic counter field (212) as a message and the private activation key field (218) as the key. In other embodiments, the CID (204) or nonce (222) may be used as the key.

The non-volatile storage (202) includes a monotonic counter (MTC) (212). In one embodiment, the controller (228) updates the MTC (212) while, in other embodiments, the cryptographic engine (232) updates the MTC (212). In the illustrated embodiment, the MTC (212) comprises an incrementing value. In some embodiments, the is manually incremented by the cryptographic engine (232) in response to an external command to increment the MTC (212). In other embodiments, the MTC (212) may be updated each time one or more types of commands are received. In general, the MTC (212) may be updated in various ways so as to fulfill the goal of providing a random value. As described above, the value of MTC (212) may be used to generate the response code (220). This functions as a device-generated nonce that allows the response code (220) to change every time activation is requested (described below) and ensure that the response code is unique to the device (108).

The non-volatile storage (202) includes a customer authentication key (CAK) field (208). In one embodiment, a CAK comprises a symmetric key. In one embodiment, a customer system (106) and manufacturer (110) both maintain the CAK for the given customer. Thus, the manufacturer (110) may store CAKs for each customer, and each customer stores its own CAK. In one embodiment, the CAK is periodically updated (e.g., at regular intervals). In the illustrated embodiment, the CAK (208) may be written by the manufacturer (110) when manufacturing the device. As discussed, the manufacturer (110) may periodically transmit CID-CAK pairs to the KMS (102). The KMS (102) may additionally transmit CAKs to the TP (104) along with activation codes for multiple devices.

The non-volatile storage (202) includes a device storage root key (MFGSRK) field (210). In one embodiment, the MFGSRK (210) is written by the manufacturer (110) during manufacturing. In one embodiment, the MFGSRK (210) is uniquely paired to the UID (206). No limitation is placed on the specific mechanism used by the manufacturer (110) to generate the MFGSRK (210); however, a fixed-width value generated via a cryptographic algorithm is generally utilized.

The non-volatile storage (202) includes a final storage root key (SHRSRK) field (214). In one embodiment, SHRSRK (214). The non-volatile storage (202) additionally includes a candidate storage root key (CSRK) field (210). In one embodiment, the cryptographic engine (232) generates the CSRK using the response code (220) and the activation code (218). In one embodiment, the cryptographic engine (232) performs an HMAC operation (224) using the response code (220) as the message and the activation code (218) as the key. The results of the operation are stored in the CSRK field (210). The cryptographic engine (232) may then receive a second command to commit the value of the CSRK field (210). In one embodiment, after validating the command (e.g., validating a digital signature), the cryptographic engine (232) copies of the contents of the CSRK field (210) to the SHRSRK field (214). In some embodiments, the cryptographic engine (232) may also erase the contents of the CSRK field (210) after the candidate key is written to the SHRSRK field (214).

The non-volatile storage (202) includes a customer nonce value (222). In one embodiment, the customer nonce value (222) is generated based on an external nonce value. In one embodiment, this external nonce value is generated by a KMS and transmitted to the device (108). In one embodiment, the customer nonce value (222) is generated by performing a concatenation operation on the CID (204), and the received external nonce and performing a SHA256 operation on the result.

Figure 3:
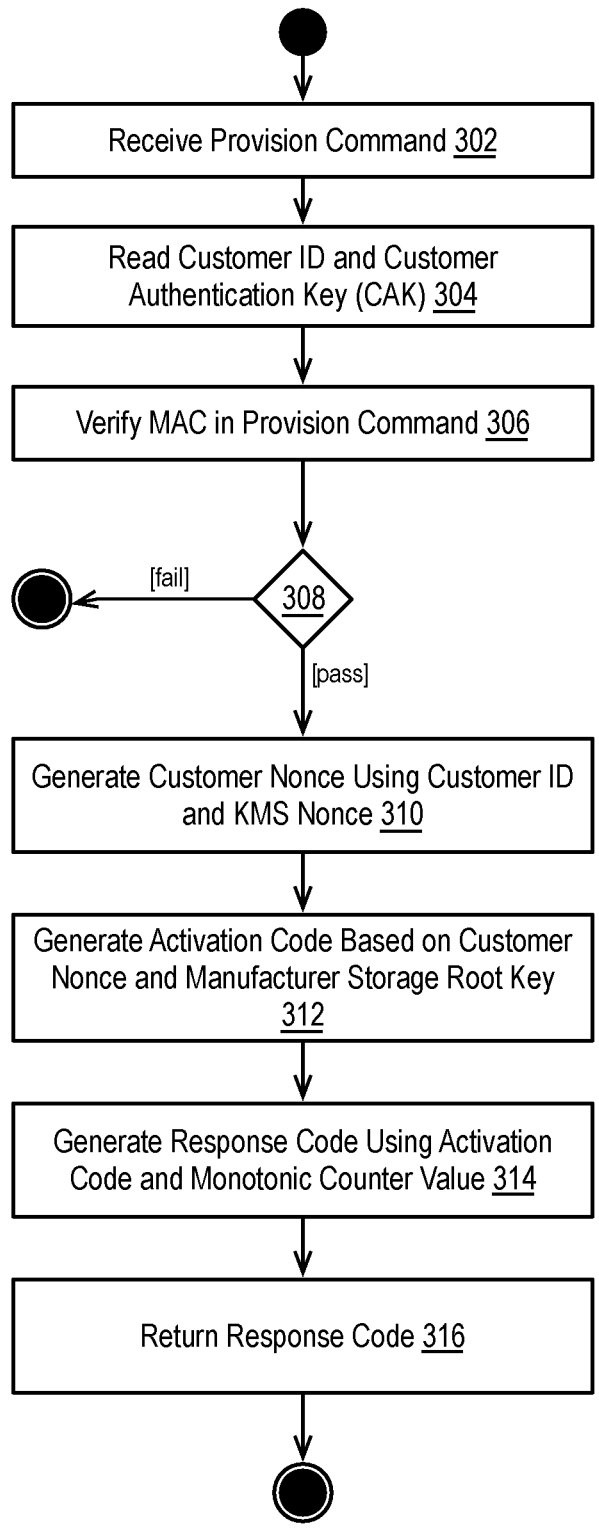
FIG. 3 is a flow diagram illustrating a method for provisioning one or more semiconductor devices according to some embodiments.
Figure 4:
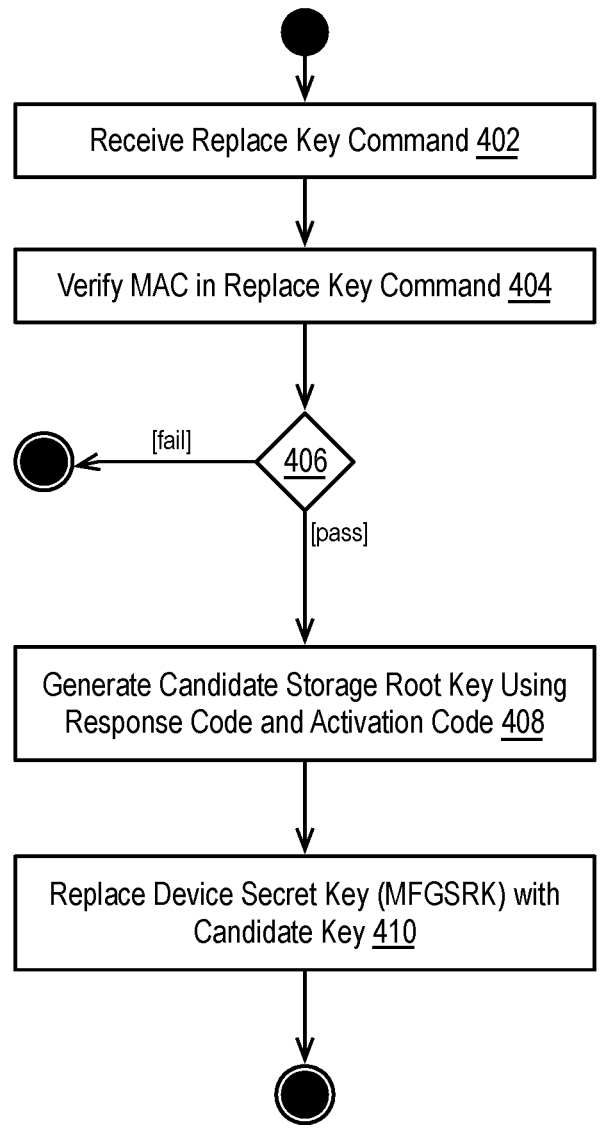
FIG. 4 is a flow diagram illustrating a method for replacing a storage root key one or more semiconductor devices according to some embodiments.

The aforementioned operations of the cryptographic engine (232) and the use of the various fields (204-222) are described in more detail in reference to FIGS. 3 and 4.

FIG. 3 is a flow diagram illustrating a method for provisioning one or more semiconductor devices according to some embodiments. In the illustrated embodiment, a semiconductor device (108) receives public data (e.g., CID, KMS nonce, MAC) from a host processor and returns a public response code. The response code will be submitted to the TP (104) to securely generate a secret key. Similarly, the semiconductor device (108) will use the response code to securely generate a secret candidate key on the semiconductor device (108). Thus, the secret keys stored by the TP (104) and the semiconductor device (108) will be identical.

In step 302, the method receives a provision command. In the illustrated embodiment, the method is executed by a semiconductor device such as a semiconductor device (108). In one embodiment, the provision command is received over a wired bus via an interface such as an SPI, UART, I2C (Inter-Integrated Circuit), SMBus (System Management Bus), or similar interface. In other embodiments, the commands may be received via a wireless transceiver.

In one embodiment, the provision commands include a CID value, a KMS nonce value, and a message authentication code (MAC) generated based on a CAK. The CID, KMS nonce, and CAK values have been described previously, and that description is not repeated herein. In one embodiment, the MAC comprises a signature generated by the TP (104). In one embodiment, the customer system (106) issues a request to the TP (104) to generate a MAC for a given message. The customer system (106) then inserts this MAC into the provision command.

In step 304, the method reads a CID and CAK. In one embodiment, the CID comprises a public customer identifier stored by the semiconductor device. In the same embodiment, the CAK comprises a secret key uniquely associated with the CID and not publicly exposed. In some embodiments, the semiconductor device includes multiple CAKs for multiple customers, but only a single CID. In one embodiment, the CAK is limited to a specified date range, thus becoming invalid after the last day of the range passes. Details of the CAK and CID are provided in the description of FIG. 2 and are not repeated herein. In the illustrated embodiment, the method reads the CAK value from a non-volatile storage location using the CID extracted from the provision command itself. In an alternative embodiment, the CID value may be written to the semiconductor device during manufacturing and thus read from NV storage.

In step 306, the method generates a candidate MAC for the provision command. In one embodiment, a cryptographic engine of the semiconductor device generates a candidate MAC by computing the MAC using the CAK as a key and the CID and KMS nonce as the message. In some embodiments, additional data may be added to the message. In the illustrated embodiment, the device accesses the CAK stored in the NV storage to compute the MAC and compares the MAC computed on the device to the MAC of the provision command to validate the command. In one embodiment, an AES-CMAC algorithm is used to generate and validate MACs, although other MAC algorithms may be used.

In step 308, the method compares the candidate MAC to the MAC of the provision command. If the comparison fails, the method ends, and the command is not processed since it cannot be validated.

In step 310, the method verifies that the received MAC is valid and proceeds to process the command. Specifically, in step 310, the method generates a second nonce, referred to as a "customer nonce," based on the KMS nonce value and the CID value. In one embodiment, the method concatenates the KMS nonce value and the CID value and computes a SHA256 value based on the computed value. That is, $Nonce_{customer}=SHA256(CID\|Nonce_{KMS})$. Certainly, other techniques for generating a nonce may be used. Notably, the use of a CID and KMS nonce value tie the customer nonce to a specific customer and effectively eliminates nonce collisions among customers.

Next, in step 312, the method generates an activation code based on the customer nonce value and a manufacturer storage root key (MFGSRK). As discussed above, the value of MFGSRK may be private and not accessible to external devices, including a customer system (106) In one embodiment, the method generates an activation code using a MAC algorithm. In one embodiment, the MAC algorithm comprises an HMAC algorithm. In one embodiment, the HMAC algorithm comprises an HMAC-SHA256 algorithm. As will be used herein, the HMAC-SHA256 is represented by C=HMAC-SHA256(K,M), where K represents a secret key, M comprises the message to encode, and C represents the ciphertext generated by the HMAC-SHA256 algorithm. Other algorithms may be used. In some embodiments, the fixed length of the activation code is equal to the fixed length of the customer nonce.

In the illustrated embodiment, the activation code is generated using the customer nonce value as the MAC message and the value of MFGSRK as the key. Thus, Activation Code=HMAC-SHA256(MFGSRK, $nonce_{customer}$), where the first parameter (MFGSRK) comprises the key, and the value of $nonce_{customer}$ comprises the message. The resulting code comprises an irreversible 256-bit activation code.

In some embodiments, the activation code is written to a non-volatile storage location in the semiconductor device (108). In some embodiments, this location temporarily stores the activation code and is erased upon replacing the storage root key (described in FIG. 4). Notably, in the illustrated embodiment, the activation code is not returned to the customer system but rather is private to the semiconductor device (108).

In step 314, the method generates a response code using the activation code and a monotonic counter value. In one embodiment, the method generates a response code using a MAC algorithm. In one embodiment, the MAC algorithm comprises an HMAC algorithm. In one embodiment, the HMAC algorithm comprises an HMAC-SHA256 algorithm. Other algorithms may be used. In some embodiments, the fixed length of the response code is equal to the fixed length of the activation code.

In the illustrated embodiment, the response code is generated using the value of the monotonic counter as the MAC message and the value of the activation code as the key. Thus, Response Code=HMAC-SHA256(Activation Code, MTC), where the first parameter (Activation Code) comprises an incrementing monotonic counter used as the key, and the value of the MTC comprises the message. The resulting code comprises an irreversible 256-bit response code.

Finally, in step 316, the method returns the response code to the device issuing the provision command. In another embodiment, the method may return the response code directly to TP (104), while, in the illustrated embodiment, the device returns the response code to the customer system (106). In one embodiment, a customer system (106) reads the response code and uploads the response code to the TP (104). In one embodiment, the customer system (106) may also transmit the UID of the device (108) along with the response code generated in the method illustrated in FIG. 3. As will be described in FIG. 4, the customer system (106) may then request a MAC to replace a key on the device (108) and issue the command to modify the storage root key of the underlying device.

In one embodiment, the method illustrated in FIG. 3 includes an additional step 318, performed after step 316. In this embodiment, step 318 includes generating a candidate key based on the response code and activation code. In one embodiment, the method generates a candidate key using a MAC algorithm. In one embodiment, the MAC algorithm comprises an HMAC algorithm. In one embodiment, the HMAC algorithm comprises an HMAC-SHA256 algorithm. Other algorithms may be used. In some embodiments, the fixed length of the candidate key is equal to the fixed length of the MFGSRK value. In one embodiment, the method computes the candidate key using the response code as the key to a MAC algorithm and the activation code as the message. Thus, in some embodiments, the candidate key can be computed as:

$$\text{Candidate Key=HMAC-SHA256(Response Code, Activation Code)}.$$

In some embodiments, the parameters may be swapped. In some embodiments, the semiconductor device (108) will return the response code and then generate the candidate key. In other embodiments, the semiconductor device (108) may generate the candidate key before returning the response code. As will be discussed, in other embodiments, the candidate key may alternatively be generated in response to receiving a command from a host processor.

FIG. 4 is a flow diagram illustrating a method for replacing a storage root key one or more semiconductor devices according to some embodiments. In the illustrated embodiment, the method is performed by a semiconductor device after the semiconductor device generates and returns a response as described more fully in the description of FIG. 3.

In step 402, the method receives a command to replace a storage key, referred to alternatively as a replace command. In the illustrated embodiment, the command to replace a storage key causes a semiconductor device (e.g., 108) to commit the candidate key as the semiconductor device's active secret key.

In one embodiment, the replace command includes a MAC. In one embodiment, the customer system (106)

generates the MAC by issuing a request to the TP (104). In one embodiment, the MAC is generated based on the UID of a semiconductor device (108). The customer system (106) then includes the MAC in the replace command and issues the command to the semiconductor device (108). In one embodiment, the MAC is generated using an AES-CMAC algorithm and uses the value of the CAK as the key. In one embodiment, the value of the KMS nonce is used as the message.

In step 404, the method generates a candidate MAC for the replace command. In one embodiment, a cryptographic engine of the semiconductor device generates a candidate MAC by computing the MAC using the CAK as a key and the KMS nonce as the message. In some embodiments, additional data may be added to the message. In the illustrated embodiment, the device accesses the CAK stored in the NV storage to compute the MAC and compares the MAC computed on the device to the MAC of the replace command to validate the command. In one embodiment, an AES-CMAC algorithm is used to generate and validate MACs, although other MAC algorithms may be used.

In step 406, the method compares the candidate MAC to the MAC of the replace command. If the comparison fails, the method ends, and the command is not processed since it cannot be validated.

In step 408, the method generates a candidate key based on the response code and activation code. As described above, in some embodiments, this step 408 is optional is the candidate key was generated in response to the provision command, as described in the description of FIG. 3.

In one embodiment, the method generates a candidate key using a MAC algorithm. In one embodiment, the MAC algorithm comprises an HMAC algorithm. In one embodiment, the HMAC algorithm comprises an HMAC-SHA256 algorithm. Other algorithms may be used. In some embodiments, the fixed length of the candidate key is equal to the fixed length of the MFGSRK value. In one embodiment, the method computes the candidate key using the response code as the key to a MAC algorithm and the activation code as the message. Thus, in some embodiments, the candidate key can be computed as:

Candidate Key=HMAC-SHA256(Response Code, Activation Code).

In some embodiments, the parameters may be swapped. In step 410, the method replaces the MFGSRK used as the device's secret key with the value of the candidate key. As described in more detail in the description of FIG. 2, the device (108) temporarily stores the candidate key in NV storage (216). The device (108) additionally retains the value of MFGSRK as the active key (210). During step 410, the method copies the value of the candidate key to a location representing the active secret key. In one embodiment, the device (108) may not include a separate location (214) for the new key. Instead, the device (108) may copy the contents of the candidate key storage location (216) to the location (210) the MFGSRK is stored, effectively overwriting the value of MFGSRK. Alternatively, the method may copy the contents of the candidate key storage location (216) to a separate location (214) and instruct the cryptographic engine (222) to use the new key (214) as the active secret key. In this manner, the MFGSRK is retained despite a new active secret key being used. In one embodiment, the cryptographic engine (222) may include firmware and/or circuitry to automatically use the contents of location (214) in lieu of the contents of location (210) when data is written to the location (214). In some embodiments, the method will further erase the candidate key from any temporary storage locations prior to ending.

Figure 5:
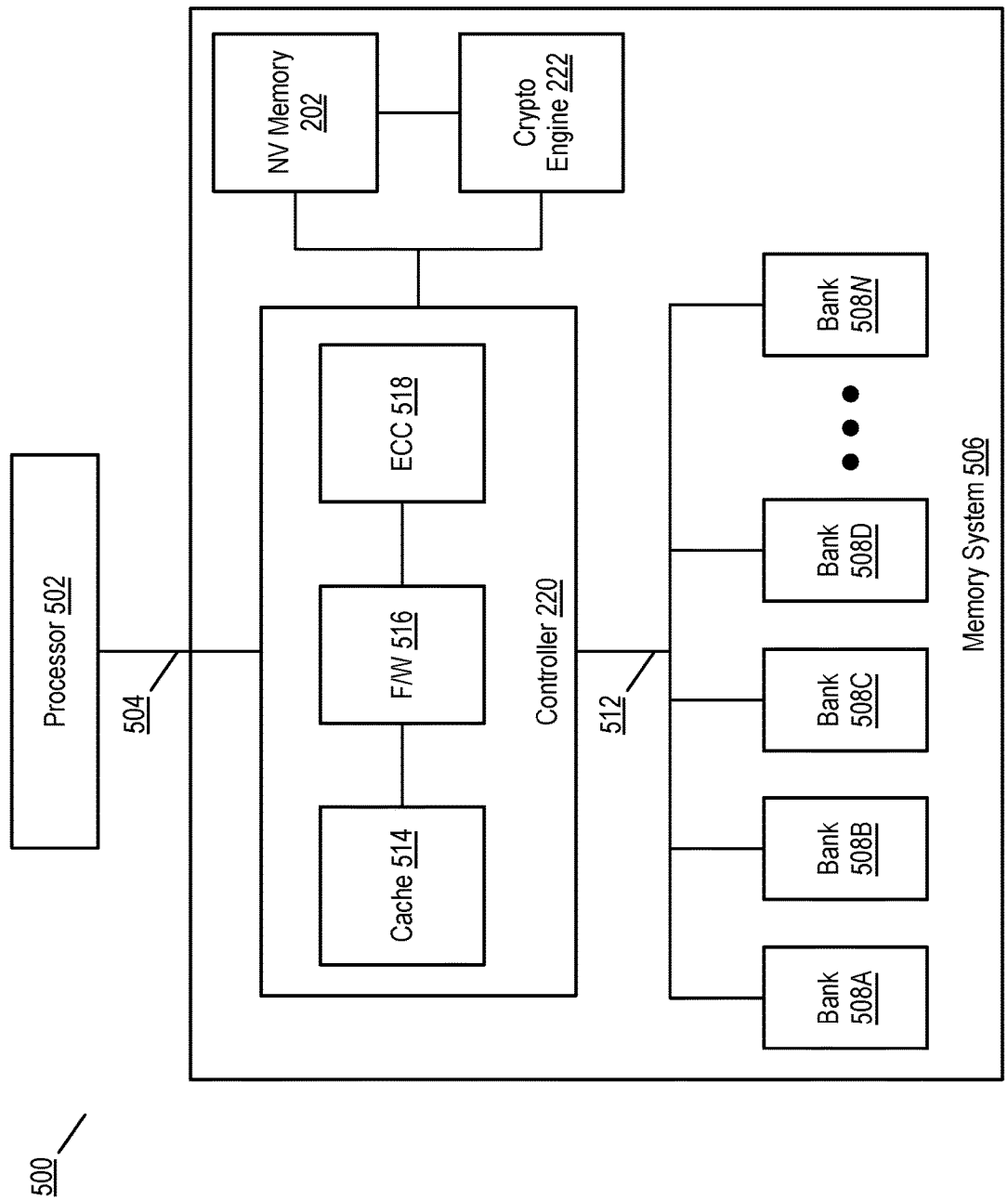
FIG. 5 is a block diagram illustrating a memory system according to some embodiments of the disclosure.

FIG. 5 is a block diagram illustrating a memory system according to some embodiments of the disclosure.

As illustrated in FIG. 5, a computing system (500) includes a processor (502) communicatively coupled to a memory system (506) via a bus (504). The memory system (506) comprises a controller (220) communicatively coupled to one or more memory banks (508A-N) via a bus/interface (512). As illustrated, the controller (220) includes a local cache (514), firmware (516), and ECC module (520).

In the illustrated embodiment, processor (502) can comprise any type of computing processor such as a central processing unit, graphics processing unit, or other type of general or special-purpose computing device. Processor (502) includes one or more output ports that allow for the transmission of address, user, and control data between processor (502) and the memory system (506). In the illustrated embodiment, this communication is performed over bus (504). In one embodiment, the bus (504) comprises an input/output (I/O) bus or similar type of bus.

The memory system (506) is responsible for managing one or more memory banks (508A-508N). In one embodiment, the banks (508A-508N) comprise NAND Flash dies or other configurations of non-volatile memory.

The banks (508A-508N) are managed by the controller (220). In some embodiments, the controller (220) comprises a computing device configured to mediate access to and from banks (508A-508N). In one embodiment, the controller (220) comprises an ASIC or other circuitry installed on a printed circuit board housing the banks (508A-508N). In some embodiments, the controller (220) may be physically separate from the banks (508A-508N). Controller (220) communicates with the banks (508A-508N) over interface (512). In some embodiments, this interface (512) comprises a physically wired (e.g., traced) interface. In other embodiments, the interface (512) comprises a standard bus for communicating with banks (508A-508N).

Controller (220) comprises various modules (514-518). In one embodiment, the various modules (514-518) comprise various physically distinct modules or circuits. In other embodiments, the modules (514-518) may completely (or partially) be implemented in software or firmware.

As illustrated, firmware (516) comprises the core of the controller and manages all non-cryptographic operations of the controller (220). Cryptographic engine (222) is provided for cryptographic operations, as described in more detail in FIG. 2. Thus, firmware (516) mediates access to banks (508A-508N) for non-cryptographic operations. As illustrated, both controller (220) and engine (222) access non-volatile (NV) storage (202). Details of accessing NV storage (202) are provided in the description of FIG. 2 and are not repeated herein.

Figure 6:
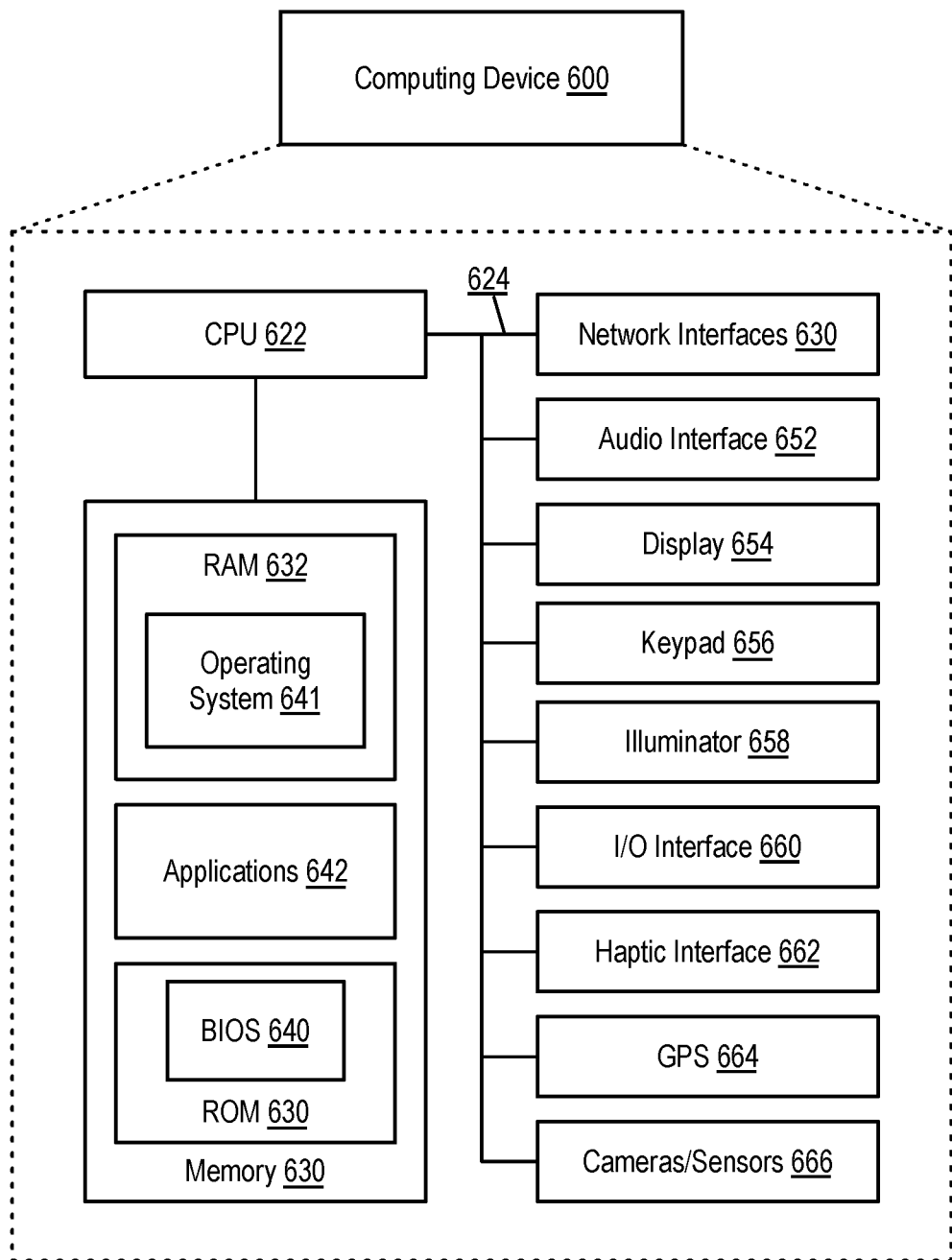
FIG. 6 is a block diagram illustrating a computing device showing an example embodiment of a computing device used in the various embodiments of the disclosure.

FIG. 6 is a block diagram illustrating a computing device showing an example embodiment of a computing device used in the various embodiments of the disclosure. The device (600) may comprise a computing device used by manufacturer (110), KMS (102), TP (104), or customer system (106). Further, various components (e.g., 730, 734) may comprise a device including a semiconductor device (108) or may comprise the semiconductor device (108) itself.

The computing device (600) may include more or fewer components than those shown in FIG. 6. For example, a server computing device may not include audio interfaces, displays, keypads, illuminators, haptic interfaces, GPS receivers, cameras, or sensors.

As shown in the figure, the device (600) includes a processing unit (CPU) (622) in communication with a mass memory (630) via a bus (624). The computing device (600) also includes one or more network interfaces (650), an audio interface (652), a display (654), a keypad (656), an illuminator (658), an input/output interface (660), a haptic interface (662), an optional global positioning systems (GPS) receiver (664) and a camera(s) or other optical, thermal, or electromagnetic sensors (666). Device (600) can include one camera/sensor (666), or a plurality of cameras/sensors (666), as understood by those of skill in the art. The positioning of the camera(s)/sensor(s) (666) on the device (600) can change per device (600) model, per device (600) capabilities, and the like, or some combination thereof.

The computing device (600) may optionally communicate with a base station (not shown), or directly with another computing device. Network interface (650) is sometimes known as a transceiver, transceiving device, or network interface card (NIC).

The audio interface (652) produces and receives audio signals such as the sound of a human voice. For example, the audio interface (652) may be coupled to a speaker and microphone (not shown) to enable telecommunication with others or generate an audio acknowledgment for some action. Display (654) may be a liquid crystal display (LCD), gas plasma, light-emitting diode (LED), or any other type of display used with a computing device. Display (654) may also include a touch-sensitive screen arranged to receive input from an object such as a stylus or a digit from a human hand.

Keypad (656) may comprise any input device arranged to receive input from a user. Illuminator (658) may provide a status indication or provide light.

The computing device (600) also comprises input/output interface (660) for communicating with external devices, using communication technologies, such as USB, infrared, Bluetooth™, or the like. The haptic interface (662) provides tactile feedback to a user of the client device.

Optional GPS transceiver (664) can determine the physical coordinates of the computing device (600) on the surface of the Earth, which typically outputs a location as latitude and longitude values. GPS transceiver (664) can also employ other geo-positioning mechanisms, including, but not limited to, triangulation, assisted GPS (AGPS), E-OTD, CI, SAI, ETA, BSS, or the like, to further determine the physical location of the computing device (600) on the surface of the Earth. In one embodiment, however, the computing device (600) may through other components, provide other information that may be employed to determine a physical location of the device, including, for example, a MAC address, Internet Protocol (IP) address, or the like.

Mass memory (630) includes a RAM (632), a ROM (634), and other storage means. Mass memory (630) illustrates another example of computer storage media for storage of information such as computer-readable instructions, data structures, program modules, or other data. Mass memory (630) stores a basic input/output system ("BIOS") (640) for controlling the low-level operation of the computing device (600). The mass memory also stores an operating system (641) for controlling the operation of the computing device (600)

Applications (642) may include computer-executable instructions which, when executed by the computing device (600), perform any of the methods (or portions of the methods) described previously in the description of the preceding Figures. In some embodiments, the software or programs implementing the method embodiments can be read from hard disk drive (not illustrated) and temporarily stored in RAM (632) by CPU (622). CPU (622) may then read the software or data from RAM (632), process them, and store them to RAM (632) again.

The disclosure includes various devices which perform the methods and implement the systems described above, including data processing systems which perform these methods, and computer readable media containing instructions which when executed on data processing systems cause the systems to perform these methods.

The description and drawings are illustrative and are not to be construed as limiting. Numerous specific details are described to provide a thorough understanding. However, in certain instances, well-known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

In this description, various functions and operations may be described as being performed by or caused by software code to simplify description. However, those skilled in the art will recognize what is meant by such expressions is that the functions result from execution of the code by one or more processors, such as a microprocessor, Application-Specific Integrated Circuit (ASIC), graphics processor, and/or a Field-Programmable Gate Array (FPGA). Alternatively, or in combination, the functions and operations can be implemented using special purpose circuitry (e.g., logic circuitry), with or without software instructions. Embodiments can be implemented using hardwired circuitry without software instructions, or in combination with software instructions. Thus, the techniques are not limited to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine-readable medium can be used to store software and data which when executed by a computing device causes the device to perform various methods. The executable software and data may be stored in various places including, for example, ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine-readable medium in entirety at a particular instance of time.

Examples of computer-readable media include but are not limited to recordable and non-recordable type media such as volatile and non-volatile memory devices, read only memory (ROM), random access memory (RAM), flash memory devices, solid-state drive storage media, removable disks, magnetic disk storage media, optical storage media (e.g., Compact Disk Read-Only Memory (CD ROMs), Digital Versatile Disks (DVDs), etc.), among others. The computer-readable media may store the instructions.

In general, a tangible or non-transitory machine-readable medium includes any mechanism that provides (e.g., stores) information in a form accessible by a machine (e.g., a computer, mobile device, network device, personal digital assistant, manufacturing tool, any device with a set of one or more processors, etc.).

In various embodiments, hardwired circuitry may be used in combination with software and firmware instructions to implement the techniques. Thus, the techniques are neither limited to any specific combination of hardware circuitry and software nor to any particular source for the instructions executed by a computing device.

Various embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (IOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

In some embodiments, the computing device can be a computer or host system, which is implemented, for example, as a desktop computer, laptop computer, network server, mobile device, or other computing device that includes a memory and a processing device. The host system can include or be coupled to a memory sub-system so that the host system can read data from or write data to the memory sub-system. The host system can be coupled to the memory sub-system via a physical host interface. In general, the host system can access multiple memory sub-systems via a same communication connection, multiple separate communication connections, and/or a combination of communication connections.

In some embodiments, the computing device is a system including one or more processing devices. Examples of the processing device can include a microcontroller, a central processing unit (CPU), special purpose logic circuitry (e.g., a field programmable gate array (FPGA), an application specific integrated circuit (ASIC), etc.), a system on a chip (SoC), or another suitable processor.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:
1. A method comprising:
receiving, by a semiconductor device, a command from a host processor;
generating, by the semiconductor device, a response code in response to the command, the response code comprising a hash value generated using a monotonic counter as a message and a storage root key;
transmitting, by the semiconductor device, the response code to a processing device, the response code causing the processing device to generate a replacement key;
receiving, by the semiconductor device from the host processor, a command to replace the storage root key of the semiconductor device, the command to replace the storage root key including a signature generated by the processing device after generating the replacement key;
generating, by the semiconductor device, a candidate replacement key based on the response code after validating the command to replace the storage root key, the candidate replacement key being equal to the replacement key; and
replacing, by the semiconductor device, the storage root key with the candidate replacement key.

2. The method of claim 1, further comprising generating a first nonce value based on a customer ID and a second nonce value.

3. The method of claim 2, wherein the command includes the customer ID and the second nonce value.

4. The method of claim 2, wherein the generating the first nonce value comprises performing a hashing operation on the customer ID and the second nonce value.

5. The method of claim 2, further comprising generating an activation code based on the first nonce value.

6. The method of claim 5, wherein generating the activation code comprises performing a message authentication code (MAC) operation on the first nonce value using a manufacturer's storage root key as a key of the MAC operation.

7. The method of claim 5, wherein generating the response code comprises performing a MAC operation on the activation code using a monotonic counter value as a message.

8. The method of claim 5, wherein generating the replacement key comprises performing a MAC operation on the activation code using the response code as a message of the MAC operation.

9. A device comprising:
   a non-volatile storage area;
   a controller for receiving a first and a second command from an external computing device; and
   a cryptographic processor configured to:
   generate a response code in response to the first command, the response code comprising a hash value generated using a monotonic counter as a message and a storage root key;
   transmit the response code to a processing device, the response code causing the processing device to generate a replacement key;
   generate a candidate replacement key based on the response code in response to the second command after validating the second command, the candidate replacement key being equal to the replacement key, and the second command including a signature generated by the processing device after generating the replacement key; and
   replace the storage root key with the candidate replacement key.

10. The device of claim 9, wherein the cryptographic processor is further configured to generate a first nonce value based on a customer ID and a second nonce value.

11. The device of claim 10, wherein the command includes the customer ID and the second nonce value.

12. The device of claim 10, wherein the generating the first nonce value comprises performing a hashing operation on the customer ID and the second nonce value.

13. The method device of claim 10, wherein the cryptographic processor is further configured to generate an activation code based on the first nonce value.

14. The device of claim 13, wherein generating the activation code comprises performing a message authentication code (MAC) operation on the first nonce value using a manufacturer's storage root key as a key of the MAC operation.

15. The device of claim 13, wherein generating the response code comprises performing a MAC operation on the activation code using a monotonic counter value as a message.

16. The device of claim 13, wherein generating the replacement key comprises performing a MAC operation on the activation code using the response code as a message of the MAC operation.

17. A non-transitory computer-readable storage medium for tangibly storing computer program instructions capable of being executed by a semiconductor device, the computer program instructions defining steps of:
   receiving a command from a host processor;
   generating a response code in response to the command, the response code comprising a hash value generated using a monotonic counter as a message and a storage root key;
   returning the response code to a processing device;
   receiving a command to replace the storage root key of the device, the command to replace the storage root key including a signature generated by the processing device after generating the replacement key;
   generating a candidate replacement key based on the response code after validating the command to replace the storage root key, the candidate replacement key being equal to the replacement key; and
   replacing the storage root key with the candidate replacement key.

18. The computer-readable storage medium of claim 17, the computer program instructions further defining the step of generating a first nonce value based on a customer ID and a second nonce value.

19. The computer-readable storage medium of claim 18, the computer program instructions further defining the step of generating an activation code based on the first nonce value.

20. The computer-readable storage medium of claim 19, wherein generating the replacement key comprises performing a MAC operation on the activation code using the response code as a key of the MAC operation.

* * * * *